Feb. 10, 1931.                M. LAGARD                 1,791,930
                            RESILIENT WHEEL
                           Filed June 17, 1929

Inventor
Major Lagard

By Hardway & Cathey
Attorneys

Patented Feb. 10, 1931

1,791,930

UNITED STATES PATENT OFFICE

MAJOR LAGARD, OF HOUSTON, TEXAS

RESILIENT WHEEL

Application filed June 17, 1929. Serial No. 371,621.

This invention relates to new and useful improvements in a resilient wheel.

One object of the invention is to provide a wheel of the character described specially designed for use on vehicles particularly motor vehicles and which will be sufficiently resilient to dispense with the necessity of pneumatic tires.

Another object of the invention is to provide a resilient wheel of the character described having a hub and a suitable rim fixed relative to the hub either by means of the conventional spokes or disc and also having a sectional tread or tire disposed around the rim and yieldably mounted so as to give the desired resiliency to the wheel with intermeshing means between the rim and the outer or tire sections to give the desired tractive capacity.

Figure 1:
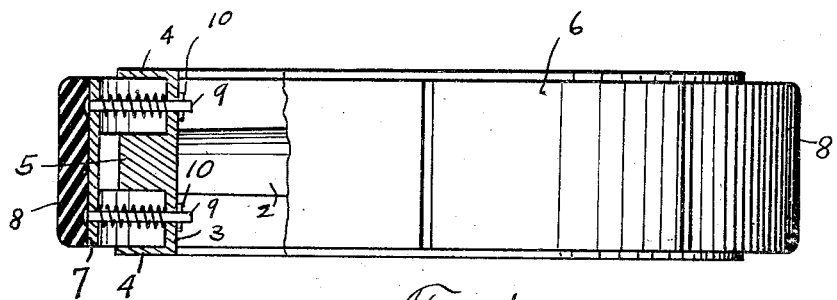
Figure 2:
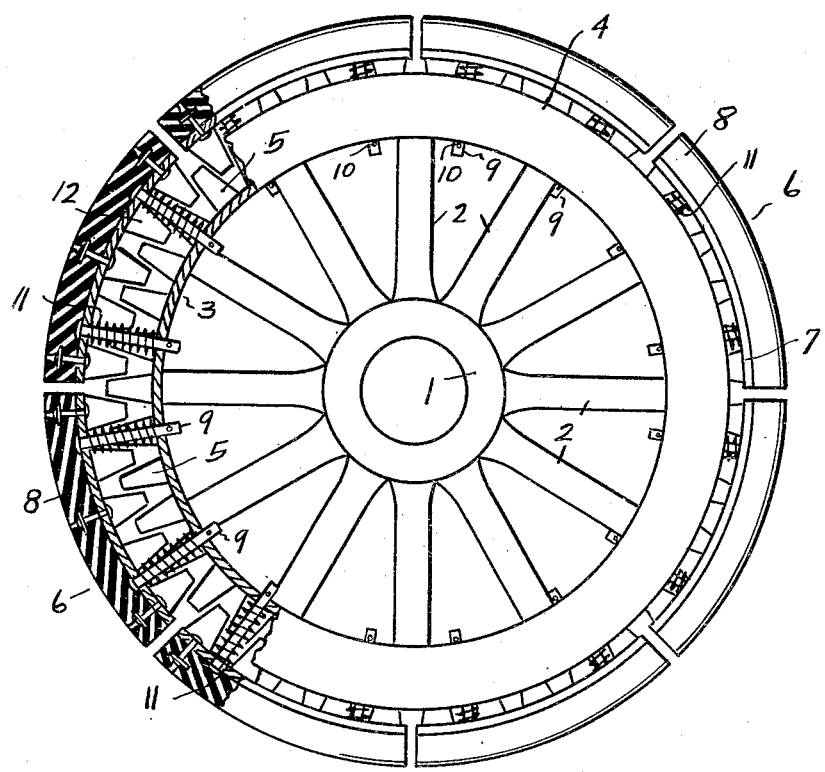

With the above and other objects in view the invention has particular relation to certain novel features of construction, operation and arrangements of parts, an example of which is given in this specification and illustrated in the accompanying drawings wherein Figure 1 shows a plan view of the wheel partly in section, and Figure 2 shows a side elevation thereof partly in section.

In the drawings the numeral 1 designates the hub having the usual radiating spokes 2 with the rim 3 around and secured to the outer ends of said spokes. This rim is channel like in cross sectional contour having the outwardly extending annular side flanges 4, 4. Secured to the rim between said flanges are the radially extending gear like teeth 5 preferably spaced a uniform distance apart therearound. There is a sectional tread or tire around the wheel composed of sections which are designated generally by the numeral 6. Each section of the tire is formed of an arcuate plate, as 7, with the rubber tread portion 8 secured thereon by suitable bolts. Each plate has guide rods 9, 9 secured thereto near their respective ends, said guide rods working inwardly through the rim 3 and their inner ends are provided with the keys 10, 10 to prevent their detachment. Interposed between the rim 3 and the corresponding plates 7 and surrounding the respective rods 9 are the coil springs 11 which give the required resiliency to the wheel. Extending inwardly from plates 7 are the gear like teeth 12 which intermesh with and are spaced from the corresponding teeth, 5. These intermeshing teeth 5 and 12 permit the radial movement of the sections 6 relative to the rim 3, but prevent their relative circumferential movement.

While I have shown what I now consider to be a preferred form of the invention, it is obvious that mechanical changes may be made therein, and equivalents substituted for the parts shown and I hereby reserve the right to make such mechanical changes as may be found desirable within the scope of the appended claim.

What I claim is:

A resilient wheel including a hub, a rim around and spaced from and concentric with the hub, means securing the rim and hub together, said rim being channel like in cross sectional contour, radial, peripheral teeth between and spaced from the side flanges of said rim, a tread around the rim formed of arcuate sections, a pair of rods at each end of each section, said rods extending inwardly through bearings in said rim and one rod of each pair being located on each side of said teeth, springs around said rods and located between said respective sections and the rim, and inwardly extending teeth carried by the sections which intermesh with the teeth of said rim.

In testimony whereof I have signed my name to this specification.

MAJOR LAGARD.